United States Patent [19]

Handl

[11] Patent Number: 5,521,239

[45] Date of Patent: May 28, 1996

[54] RUBBER ERASER AND PROCESS FOR MANUFACTURING IT

[75] Inventor: Werner Handl, Altdorf, Germany

[73] Assignee: J. S. Staedtler GmbH & Co., Nürnberg, Germany

[21] Appl. No.: 355,458

[22] Filed: Dec. 13, 1994

Related U.S. Application Data

[63] Continuation of Ser. No. 231,354, filed as PCT/DE91/00222, Mar. 13, 1991 published as WO91/14737, Oct. 30, 1991, abandoned, which is a continuation of Ser. No. 777,379, Nov. 21, 1991, abandoned.

[30] Foreign Application Priority Data

Mar. 21, 1990 [DE] Germany ............ 40 08 981.9

[51] Int. Cl.$^6$ ...................... C08K 5/42
[52] U.S. Cl. .......... 524/158; 524/279; 524/296; 524/297; 524/339; 524/425
[58] Field of Search ............ 524/279, 157, 524/158, 296, 297, 339, 425; 525/133, 165, 404

[56] References Cited

U.S. PATENT DOCUMENTS 3,878,140  4/1975  Sheppard ................... 524/39
4,288,570  9/1981  Coron et al. ................ 525/183
4,530,806  7/1995  Melchior .................... 252/13

FOREIGN PATENT DOCUMENTS 60137192  2/1986  Japan .
61-029597  2/1986  Japan .

*Primary Examiner*—Jeffrey T. Smith
*Attorney, Agent, or Firm*—Kenyon & Kenyon

[57] ABSTRACT

The invention concerns a rubber eraser made of a binder and plasticizer, as well as fillers, pigments and/or other additives, if applicable, which contains polyalkyl methacrylate (PAMA), especially polymethyl methacrylate (PMMA), polyethyl methacrylate (PEMA), polypropyl methacrylate (PPMA), polybutyl methacrylate (PBMA) and/or copolymerizates of these as the binder. Furthermore, the invention concerns processes for manufacturing such rubber erasers, where either first, a plastisol of fine-grain polyalkyl methacrylate and plasticizer is formed, and fillers, internal lubricants, pigments and/or other additives are then mixed into this plastisol, or according to which first, the PAMA powder, the filler as well as any other dry components such as internal lubricants, pigments, etc. are intimately mixed while dry, and the liquid plasticizer is then added to this mixture and mixed or kneaded in.

22 Claims, No Drawings

RUBBER ERASER AND PROCESS FOR MANUFACTURING IT

Continuation of application Ser. No. 231,354 filed as PCT/DE91/00222, Mar. 13, 1991, published as WO91/14737, Oct. 30, 1991, now abandoned, which was a continuation of application Ser. No. 777,379, filed Nov. 21, 1991, now abandoned.

SPECIFICATION

The invention relates to a rubber eraser pursuant to the main claim as well as a process for manufacturing it.

Such a rubber eraser is known, for example, from (1) DE PS 31 31 458.

It is disadvantageous in this connection that due to the PU component and the factice proportion which is often present in this, as a rule, it is necessary that both the mixture in itself and the manufacturing process must be harmonized to each other in very narrow limits, in order to obtain the correct or necessary wear properties.

In addition, these masses cannot be processed in particularly efficient manner as plastisols. The manufacture of such erasers is therefore connected with relatively high effort, so that these erasers are relatively expensive, on the whole, and can be varied with regard to their wear properties only within very narrow limits.

Furthermore, eraser masses are known from (2) DE PS 932 540, (3) DE As 28 37 159, (4) DE AS 26 36 885, (5) DE PS 25 26 404 and (6) DE PS 26 07 557, which particularly demonstrate polyvinyl chloride as the binder. Since various reservations concerning PVC have been raised recently, with regard to its environmental effects and the fact that hydrogen chloride (HCl) is split off from it when it is burned, an attempt is supposed to be made, to an increasing extent, to do without the use of this plastic. In addition, such erasers are often not resistant to UV light and to aging, over the long term, and must therefore be specially stabilized, in most cases.

It is therefore the task of the present invention to create an eraser which does not demonstrate these disadvantages, which can be manufactured according to various methods and therefore within relatively broad tolerance limits, and therefore in cost-effective manner, and which, in particular, does not contain any PVC, to reduce or avoid the emission of harmful pollutants during incineration and for simple production of products resistant to UV light and to aging.

This task is accomplished in simple manner with the characteristics of the invention, a rubber eraser made of a polyalkyl methacrylate (PAMA) binder and plasticizers, as well as fillers, solvents, pigments and/or other additives.

Preferred embodiments, further developments and manufacturing processes are comprised in the additional claims.

According to the invention, the rubber eraser is supposed to contain polyalkyl methacrylate (PAMA) as the binder, or essentially consist of this substance. A PAMA plastisol of a certain proportion of one or more PAMA component(s) and plasticizers is particularly suitable for this.

The invention is described in greater detail below on the basis of some embodiments.

GENERAL EXAMPLE

15–50% by weight polyalkyl methacrylate (PAMA)
30–50% by weight plasticizer
0–50% by weight filler
0–20% by weight glycols, pigments and/or other additives

Example 1

25% by weight polymethyl methacrylate (PMMA)
37% by weight di-(2-ethylhexyl)-phthalate (plasticizer)
38% by weight calcium carbonate (filler)

Example 2

25% by weight polybutyl methacrylate (PBMA)
37% by weight di-n-($C_6$–$C_{10}$)-alkyl phthalate (plasticizer)
40% by weight pumice meal (filler)

Example 3

48% by weight polyethyl methacrylate (PEMA)
41% by weight diisononyl phthalate (plasticizer)
11% by weight diethylene glycol

Example 4

20% by weight polypropyl methacrylate (PPMA)
43% by weight diisodecyl phthalate (DIDP = plasticizer)
37% by weight calcium carbonate (filler)

The manufacture of plastic masses according to the invention can be carried out with usual equipment, especially with conventional mixers.

Example 5

In a dissolver which can be evacuated, the PAMA powder, the plasticizer and the filler as well as any other components to be added are intimately mixed and evacuated while stirring. The plastisol obtained in this way is gelled on a twin-screw extruder and formed into an endless extrudate by means of a die. After the cooling bath, the rubber erasers are cut to the desired length and imprinted, if applicable.

Example 6

In a heating mixer, the PAMA powder and the filler are mixed at high speed. During mixing, the plasticizer is added. Due to the friction heat which occurs during this process, the plasticizer is absorbed by the PAMA grains.

The granulate is drained into a cooling mixer and cooled to room temperature.

The dry blend obtained in this manner is passed to an extruder and processed further to yield erasers, according to Example 5.

Example 7

The plastisol produced according to Example 5 is poured into sheets and gelled by means of a stage press.

The sheets obtained in this way are cut to yield erasers, and imprinted, if applicable.

Example 8

The PAMA granulate and the plasticizer are first intimately mixed. Then the other components are mixed in, where it is advantageous if the PAMA plastisol is first produced as a relatively liquid basic mass, into which the other components are then mixed, taking the desired consistency into consideration.

Further processing can then take place according to one of the Examples 5 or 7.

As an alternative to this, however, mixing of all the dry components, in other words the PAMA powder, the filler as well as any other solid components, such as an internal lubricant and/or the pigments, can first be produced, to which the plasticizer is then added with intimate mixing, until a homogeneous plastic mass is achieved.

The polyalkyl methacrylate (PAMA) proposed according to the invention can preferably be a polymethyl methacrylate (PMMA), a polyethyl methacrylate (PEMA), a polypropyl methacrylate (PPMA), a polybutyl methacrylate (PBMA) and/or a polymethyl methacrylate/n-butyl methacrylate copolymerizate.

Suitable plasticizers can be: di-(2-ethylhexyl)-phthalate, di-n-$C_6$–$C_{10}$-alkyl phthalate, diisononyl phthalate, alkyl sulfonic acid ester ($C_{12}$–$C_{20}$) of phenol, esters of phthalic, citric and/or adipinic acid, epoxy plasticizers and/or polymer plasticizers, such as phthalic acid and/or adipinic acid polyesters, for example.

I claim:

1. A rubber eraser consisting essentially of: polyalkyl methacrylate (PAMA) binder; a plasticizer selected from the group consisting of di-(2-ethylhexyl)-phthalate, di-n-($C_6$–$C_{10}$)-alkyl phthalate, diisononyl phthalate, alkyl sulfonic acid esters ($C_{12}$–$C_{20}$) of phenols, esters of phthalic, citric and adipinic acid, epoxy plasticizers, polymer plasticizers, phthalic acid polyesters and adipinic acid polyesters; filler; and additive; wherein the eraser is resistant to UV light and aging.

2. The rubber eraser of claim 1, wherein said polyalkyl methacrylate (PAMA) is selected from the group consisting of polymethyl methacrylate (PMMA), polyethyl methacrylate (PEMA), polypropyl methacrylate (PPMA), and polybutyl methacrylate (PBMA).

3. The rubber eraser of claim 1, wherein said PAMA is a copolymer.

4. The rubber eraser of claim 3, wherein said copolymer is a polymethyl methacrylate/n-butyl methacrylate copolymerizate.

5. The rubber eraser of claim 1, wherein said plasticizer is selected from the group consisting of di-(2-ethylhexyl)-phthalate and di-n-($C_6$–$C_{10}$)-alkyl phthalate.

6. The rubber eraser of claim 1, wherein said plasticizer is selected from the group consisting of diisononyl phthalate and an alkyl sulfonic acid ester ($C_{12}$–$C_{20}$) of phenol.

7. The rubber eraser of claim 1, wherein said plasticizer is an ester selected from the group consisting of phthalic, adipinic and citric acid.

8. The rubber eraser of claim 1, wherein said plasticizer is an epoxy.

9. The rubber eraser of claim 1, wherein said plasticizer is diisodecyl phthalate (DIDP).

10. The rubber eraser of claim 1, wherein said plasticizer is a polymer.

11. The rubber eraser of claim 10, wherein said polymer plasticizer is selected from the group consisting of phthalic acid and adipinic acid polyester.

12. The rubber eraser of claim 1, wherein said filler is selected from the group consisting of calcium carbonate, pumice meal, and glass powder.

13. The rubber eraser of claim 1, wherein said additive is a solvent.

14. The rubber eraser of claim 13, wherein said solvent is diethylene glycol.

15. The rubber eraser of claim 1, wherein said additive is a pigment.

16. The rubber eraser of claim 1, wherein said additive is an internal lubricant.

17. The rubber eraser of claim 1, wherein said additive is pumice meal.

18. The rubber eraser of claim 1, wherein said plasticizer, said PAMA particles, said filler, and said additive are gelled.

19. A rubber eraser consisting of:
a) 25% by weight polymethyl methacrylate (PMMA);
b) 37% by weight di-(2-ethylhexyl)-phthalate; and
c) 38% by weight Calcium carbonate.

20. A rubber eraser consisting of:
a) 25% by weight polybutyl methacrylate (PBMA);
b) 37% by weight di-n-($C_6$–$_{10}$)-alkyl phthalate; and
c) 40% by weight pumice meal.

21. A rubber eraser consisting of:
a) 48% by weight polyethyl methacrylate (PEMA);
b) 41% by weight diisononyl phthalate; and
c) 11% by weight diethylene glycol.

22. A rubber eraser consisting of:
a) 20% by weight polypropyl methacrylate (PPMA);
b) 43% by weight diisodecyl phthalate (DIDP); and
c) 37% by weight calcium carbonate.

* * * * *